United States Patent

Leszyk et al.

[11] 4,042,654
[45] Aug. 16, 1977

[54] MANUFACTURE OF PLASTIC PARTS BY RADIATION MOLDING

[75] Inventors: Gerald M. Leszyk; Edward D. Morrison; Robert F. Williams, Jr., all of Rochester, N.Y.

[73] Assignee: Eastman Kodak Company, Rochester, N.Y.

[21] Appl. No.: 558,031

[22] Filed: Mar. 13, 1975

[51] Int. Cl.² ............................................ B29C 13/04
[52] U.S. Cl. .................................. 264/22; 264/132;
264/160; 264/166; 264/236; 264/297; 264/299;
427/44; 427/54
[58] Field of Search ............... 264/157, 160, 166, 236,
264/347, 259, 260, 297, 316, 22, 299, 132;
427/44, 54; 101/170

[56] References Cited

U.S. PATENT DOCUMENTS

| 2,527,398 | 10/1950 | Chavannes | 264/316 |
|---|---|---|---|
| 3,551,177 | 12/1970 | Hechtman et al. | 264/316 |
| 3,719,522 | 3/1973 | Johnson et al. | 427/44 |

*Primary Examiner*—Jeffery R. Thurlow

*Attorney, Agent, or Firm*—A. P. Lorenzo

[57] ABSTRACT

Thin plastic parts which can have precise tolerances and can be of complex shape are prepared by casting a viscous radiation-curable composition onto a support, such as a moving web of polymeric material, in the shape of the desired part and then irradiating, for example with ultraviolet radiation or high energy electrons, to cause curing of the composition to a solid plastic. The radiation-curable composition is formulated with viscosity and flow characteristics which enable it to be cast in the exact shape of the part desired yet retain this shape during curing while supported only by the surface on which it has been cast. Plastic parts made by this method can be formed entirely of the radiation-curable composition by casting onto a web having a release surface from which the part can be stripped subsequent to curing or can be formed partially from a web material and partially from the radiation-curable composition by casting onto a web to which the composition will bond and subsequently cutting the web into discrete portions which include the cured composition.

15 Claims, 1 Drawing Figure

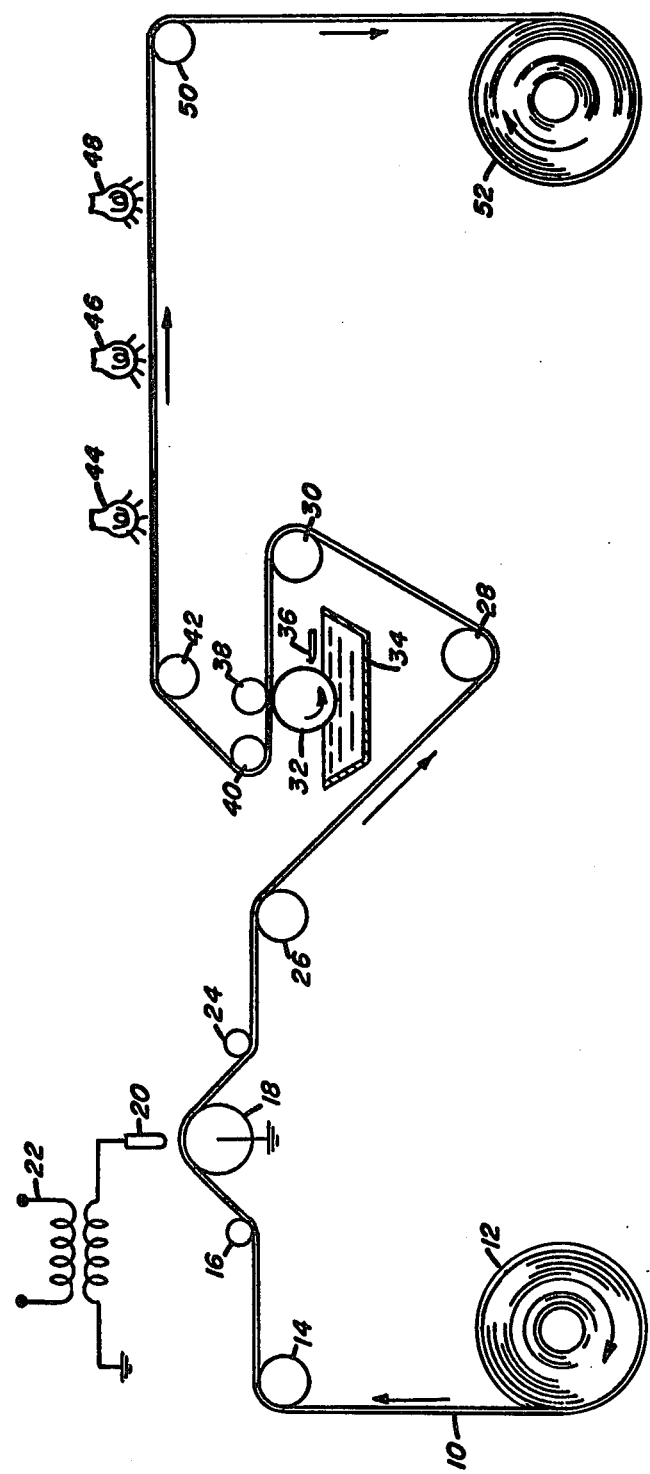

MANUFACTURE OF PLASTIC PARTS BY RADIATION MOLDING

This invention relates in general to the art of fabricating plastic materials into useful products and more specifically to a novel method of making plastic parts which may be complex in shape and extremely thin and, accordingly, are difficult to fabricate.

Certain types of plastic parts which are of very slight thickness, such as a thickness of a few mils, are not readily adaptable to fabrication by conventional processes such as injection, compression, blow or rotational molding, vacuum or cold forming or extrusion. This is especially the case if the part is of a complex design and requires precise tolerances. Such parts have been successfully manufactured by skiving, laminating or potting techniques, but these techniques are complicated and time consuming and, accordingly, are not amenable to high speed mass production.

In accordance with the present invention, plastic parts which can be very thin and which can be of very complex design are fabricated by a novel process which can be referred to as "radiation molding". In this process, a viscous radiation-curable composition is cast onto a support in the exact shape of the desired part and then irradiated, for example with ultraviolet radiation or high energy electrons, to cause curing of the composition, for example by polymerization and/or cross-linking. The support can be of a composition such that the cast material will bond to it or of a composition such that the cast material will not bond to it and can be stripped from the support after curing is effected. For example, plastic discs utilized in photographic film cartridges can be made by utilizing that form of the radiation molding process in which the cured part is stripped from the support on which it was cast, whereas plastic film material provided with a tear strip and adapted for use in packaging can be made by utilizing that form of the process in which the cast material is bonded to the support, e.g., by casting the tear strip portion onto a moving web of the film material and chopping the web into appropriate lengths after curing of the composition which forms the tear strip section. Many other types of plastic parts can be made by the radiation molding process described herein, for example, thin plastic parts requiring precise dimensional tolerances which are used in photofabrication, the manufacture of electronic components, or photographic film assemblages such as X-ray, conventional or self-processing films. The radiation molding method is useful for manufacture of plastic parts of a uniform thickness, but is especially advantageous in manufacture of parts having raised portions or indented areas which may be of complicated design.

The method of this invention is useful with any radiation-curable composition which can be formulated with viscosity and flow characteristics that enable it to be cast in the exact shape of the part desired and cured without undergoing significant alteration in its dimensions. No shape-defining mold is needed in the radiation molding process since the composition is cast on the support in the exact shape desired and is sufficiently viscous to maintain the shape while it is subjected to the radiation which brings about curing. Accordingly, the process is simpler than prior processes which require a mold and provides important advantages. For example, if a radiation-curable composition is cured within a mold, the mold has the disadvantage of shielding the composition from the radiation and absorbing a portion of the radiation. These disadvantages are avoided with the method of this invention since a mold is not required. Furthermore, the need for a mold-release agent in the composition is eliminated and problems encountered in removing thin parts from a mold are avoided.

While any radiation-curable composition that can be cast in the shape of the part desired and maintain this shape during curing can be used in the method of this invention, compositions comprising an unsaturated polymer dissolved in a polymerizable monomer are particularly advantageous. It is believed that in these compositions the monomer copolymerizes with the unsaturated polymer to form a cross-linked network. A wide variety of such radiaton-curable compositions are known. For example, classes of polymers which are useful for this purpose include epoxy diacrylates, unsaturated polyesters, unsaturated acrylics, unsaturated acrylic modified polyurethanes, unsaturated acrylic modified polythioethers, acrylated glycols and polyols, and the like. Specific examples of useful polymers are an epichlorohydrin/bisphenol-A epoxy that is reacted with acrylic acid or methacrylic acid to form acrylate or methacrylate ester end groups at both ends of the epoxy chain, as well as similar polymers prepared from novolac epoxies (fusible and soluble epoxy resins formed by condensation of a phenol with an aldehyde under acid conditions). Further examples of useful polymers are a bisphenol-A/fumaric acid polyester and a di(hydroxypropyl acrylateanhydride) modified bisphenol-A/epichlorohydrin epoxy. Oligomers can be used in the radiation-curable composition in place of or in addition to the aforesaid polymers, for example, a polyoxyethylene diacrylate oligomer.

Further examples of polymeric materials useful in radiation-curable compositions which are suitably employed in the method of this invention are described in numerous patents, for example in U.S. Pat. Nos. 3,367,992; 3,551,235; 3,554,886; 3,558,387 and 3,661,576.

The polymers and/or oligomers used in forming the radiation-curable compositions can be dissolved in polymerizable monomers such as, for example, ethyl acrylate, butyl acrylate, 2-ethylhexyl acrylate, hydroxypropyl acrylate, methyl methacrylate, 2-hydroxyethyl acrylate, styrene, neopentyl glycol diacrylate, 1,6-hexanediol diacrylate, diacetone acrylamide, acrylic acid, pentaerythritol tetraacrylate, tetraethyleneglycol dimethacrylate, 1,3-butyleneglycol dimethacrylate, tetraethyleneglycol diacrylate, trimethylolpropane triacrylate, ethylene glycol dimethacrylate, diethylene glycol dimethacrylate, vinyl acetate and the like.

The radiation-curable compositions employed in the method of this invention can contain other ingredients in addition to polymers, oligomers and polymerizable monomers. For example, when the compositions are cured by the use of ultraviolet radiation, a photoinitiator should be included in the composition. Many photoinitiators which are useful for such purpose are known to the art, for example, butyl benzoin ether, isobutyl benzoin ether, benzophenone, benzoin, acetophenone, dimethyl quinoxiline, methyl diethanol amine, 4,4'-bis(-dimethylamino)benzophenone, and the like. Such initiators may be used singly or in combination. Pigments, dyes, fillers, and similar materials can also be included in the radiation-curable composition, if desired.

The radiation-curable compositions employed in the method of this invention are compositions having a viscosity such that when they are cast on a support in the shape of the desired part they can retain such shape during the curing operation. Thus, it is not necessary to employ a mold to retain the composition in the desired shape while it is cured. More particularly, in the method of this invention, the support is advanced into a casting zone, in which the radiation-curable composition is cast onto the support in the form of successive discrete bodies which have the exact shape and thickness of the desired part, and then into a curing zone in which the composition is subjected to irradiation to effect rapid curing which converts the composition to a solid state. The material which is cast is sufficiently viscous that it retains the desired shape after being cast on the support, that is, it does not undergo any significant degree of flow even though it is unconfined and supported only by the web or other surface on which it has been cast. Following the curing operation, the solid, shaped plastic part can be removed from the support in any convenient manner such as by a knife edge which strips it from the support. Alternatively, if the support utilized is made of a material to which bonding of the coating composition takes place under the influence of radiation, the cast material will be permanently joined to the support material. Thus, a particular article to be fabricated can be partially formed from the support material and partially formed from the radiation-curable composition that is cast onto the surface of the support material. After curing the cast material to solidify it and bond it to the web, the web can be chopped into appropriate lengths, or cut into sections of any desired geometrical configuraton, or it can be wound up for storage and subsequent chopping during fabricating and finishing operations needed for the particular object or device in which the plastic part is to be incorporated.

The radiation-curable compositions used in the method of this invention are preferably compositions which are totally convertible to a solid plastic. Thus, they are preferably free of any solvent of diluent which is released during the curing operation. Such solvents or diluents are not required since the polymers and/or oligomers used in the composition can be dissolved or dispersed in a polymerizable monomer which undergoes reaction during the curing step to become a part of the solid product. This avoids release of any solvent or diluent to the atmosphere during the casting or curing steps and is advantageous since release of such materials can be hazardous or cause undesirable pollution of the atmosphere.

The viscosity of the radiation-curable composition used in the method of this invention must be low enough that the composition can be cast in the desired shape but high enough that it will retain this shape after being cast. The particular viscosity needed will depend upon such factors as the thickness and shape of the part being fabricated, the specific materials comprising the support and the coating composition, the method of casting utilized, and the speed at which the support is advanced through the casting and curing zones. Generally speaking, viscosities within the range of about 50 to about 40,000 centipoises (measured with a Brookfield Viscometer, Model RVF, at 25° C.) are useful, more preferably in the range from about 100 to about 20,000 centipoises, and most preferably in the range of from about 200 to about 10,000 centipoises. The viscosity selected within these ranges to provide optimum results in a specific situation will depend, of course, on the particular conditions being utilized in the radiation molding process. The radiation-curable composition should preferably be one which undergoes substantially no shrinkage upon curing. Compositions which are thixotropic in nature are particularly useful in the radiation molding process since they flow readily under shearing stress during the casting operation yet will resist any tendency to flow after they have been cast since shearing stress is then no longer being applied. Thus, in certain instances it may be desirable to render the radiation-curable composition thixotropic by the addition of appropriate agents, such as colloidal silica, which impart such characteristic to the composition.

The radiation-curable compositions can be cast on the support in the shape of the desired part by any of a variety of different methods. For example, it can be forced through a stencil which has been cut in the shape of the desired part. For high speed mass production of plastic parts, the casting operation can advantageously be carried out by intermittent screen printing methods well known in the art or by conventional methods of rotary screen printing or gravure printing. Thus, a conventional screen printing operation designed for use with printing inks can be readily adapted to use with the radiation-curable compositions described herein as such compositions can be readily forced through the mesh of the screen employed in such processes. In use of the gravure printing technique in the method of this invention, the radiation-curable composition can be applied to the gravure drum in a similar manner to that employed with printing inks and transferred to the moving support as it passes between the gravure drum and an impression roll.

The support on which the radiation-curable composition is cast can be composed of any suitable material, with the choice of material depending on such factors as whether the cured part is to be stripped from the support or whether the part is to be formed by casting on the support a composition which bonds to it and subsequently chopping the support bearing the cured composition to form the desired part. Typically, the support employed will be a polymeric web composed of a synthetic polymer, for example, polyesters, polyolefins, polyacrylates, polysulfones, polycarbonates, polyvinyl chloride, and the like. Supports composed of polymer-coated paper are also useful, for example, paper coated with a polyolefin such as polyethylene or polypropylene. Metallic webs and webs coated with release coatings, such as coatings of silicone elastomers or coatings of polytetrafluoroethylene, can be used when it is desired to strip the cured part from the web. On the other hand, when it is desired that the coating composition bond to the web during curing, it may be desirable to subject the web to a petreatment step immediately prior to the casting step which renders it more receptive to adhesion of coating compositions. For example, the web can be passed through a pretreatment zone immediately prior to the casting zone in which it is subjected to a corona discharge treatment by methods well known in the art. The use of corona discharge to enhance the coatability of hydrophobic surfaces has been extensively described in the prior art, for example, in British Pat. No. 971,058, British Pat. No. 1,060,526, U.S. Pat. No. 3,117,865, U.S. Pat. No. 3,220,842, U.S. Pat. No. 3,411,910 and U.S. Pat. No. 3,531,314. Apparatus and methods for curing of radiation-curable compositions by subjecting them to suitable forms of radiation are also well-known and any suitable technique can be employed in the method of this invention. For example, the composition can be one which is designed for ultraviolet curing and the curing step can be carried out with the use of a bank of ultraviolet lights providing ultraviolet radiation of a suitable intensity. Radiation curable compositions adapted to curing by high energy ionizing radiation can be employed with satisfactory results. Typical examples of the types of high energy ionizing radiation that can be used in the successful practice of this invention include X-rays, gamma rays, beta rays, and accelerated electrons. The particular physical manner whereby the ionizing radiation is applied to the curable composition in the practice of this invention is not critical. Typically, the radiation used should be of a sufficient intensity to penetrate through the entire thickness of the composition which is cast. The total dosage applied should be sufficient to bring about curing of the composition to form a solid plastic product. Typically, dosages in the amount of about 0.2 to about 50 megarads, more suitably in the range from about 0.5 to about 20 megarads are employed.

The method of this invention is useful in the manufacture of a wide variety of plastic parts, especially those which are very thin and which require relatively precise dimensional tolerances. The method finds particularly advantageous application in manufacture of parts having a thickness in the range from about 0.5 mil to about 250 mils, more preferably in the range from about 1 to about 50 mils, and most preferably in the range from about 2 to about 20 mils. The method employed in carrying out the curing step should take into account the thickness of the part being made. For example, the use of ultraviolet curing is satisfactory for clear parts with a thickness of up to about 50 mils, but if the composition is pigmented then ultraviolet curing should be used only if the part will not be thicker than about 5 mils. In using high energy electrons to accomplish the curing, the presence of pigments in the composition would not have a significant effect on the thickness of parts that can be successfully cured. The limits on thickness would be determined by the voltage of the accelerator, for example a 300 KEV accelerator would be satisfactory for a thickness of up to 25 mils and a 1.5 MEV accelerator for a thickness of up to 250 mils. Parts manufactured by the radiation molding process described herein can be parts which have a single thickness throughout or parts which are thicker in some areas than in others. For example, a part requiring a thickness of 2 mils in some areas and 1 mil in other areas can be made by using a 1 mil thick sheet as the support and applying a 1 mil thick layer of radiation-curable composition to those areas requiring a thickness of 2 mils.

The method of this invention is especially well adapted to a high speed mass production operation and this is among its most important advantages. Thus, for example, since radiaton curing can be carried out in a very short time, the fabrication of parts by the radiation molding process can be performed on a continuous basis using a moving web onto which the composition is cast, with the speed of travel of the web being limited, in the usual situation, only by the speed of the casting step. Accordingly, operation at very high speeds of several hundred feet per minute, is feasible. Preferred web speeds are in the range from about 25 to about 150 feet per minute.

The attached drawing is a schematic illustration of the method of this invention employing a gravure drum to apply the radiation-curable composition to a polymeric web.

As shown in the drawing, web 10 of a polymeric film such as polyethylene film is unwound from feed roll 12 which is mounted for rotation about its axis on a suitable framework (not shown) and passes over guide roller 14 and beneath tension roll 16 into contact with grounded metal roller 18. An electrode 20, which is positioned opposite roller 18 and supplied with a high voltage, high frequency current from the windings of transformer 22, serves to subject the surface of web 10 to a corona discharge treatment so as to improve the ability of the surface to bond to compositions which are subsequently applied thereto. After web 10 passes over roller 18 it is directed by tension roll 24 and guide rolls 26, 28 and 30 into the nip defined by gravure drum 32 and impression roll 38. Gravure drum 32 rotates within a bath 34 of viscous radiation-curable composition and this composition is wiped by doctor blade 36 into the recessed area of gravure drum 32 which defines the shape of the part which is to be cast. As web 10 passes between gravure drum 32 and impression roll 38, the composition within the recessed area is transferred to the surface of web 10. In view of the viscous nature of this composition, it retains the shape in which it was cast as web 10 passes around guide rollers 40 and 42 and beneath ultraviolet lamps 44, 46 and 48 which are positioned within a curing zone. As web 10 passes beneath ultraviolet lamps 44, 46 and 48, the composition which has been cast onto the surface of web 10 receives sufficient ultraviolet radiation that it is converted to a solid and bonded to web 10. As web 10 leaves the curing zone it passes around guide roller 50 and is wound up on take-up roll 52 which is driven by a motor and speed reducer (not shown) at a rate appropriate to advance web 10 at the desired speed.

The method of this invention can be carried out in a satisfactory manner using conventional intermittent screen printing or rotary screen printing techniques in place of the gravure printing technique illustrated in the attached drawing. When using screen printing techniques it is particularly advantageous for the radiation-curable composition to exhibit thixotropic characteristics so that it can be easily forced through the screen. Other methods of casting the radiation-curable composition onto a support in the exact shape of the part desired can also be utilized.

Plastic parts have been prepared by the method of this invention using a radiation-curable composition composed of 60 parts by weight of vinyl ester resin having a molecular weight of about 3600 (prepared by reacting methacrylic acid with an epichlorohydrin/bisphenol-A epoxy to form methacrylate ester end groups at both ends of the epoxy chain), 40 parts by weight of butyl acrylate, and 2.5 parts by weight of a mixture of butyl and isobutyl benzoin ethers, and curing this composition by irradiating it for three minutes with an ultraviolet arc (1200 watts, 110 volts, wave length 200–400 nanometers). This same radiation-curable composition, except that the mixture of butyl and isobutyl benzoin ethers was omitted, has been used in the process with curing carried out by high energy electrons generated by a 60 milliamp 300 KEV electron accelerator at a total dose of 4 megarads. Other radiation-curable compositions that have been used in the process are compositions containing vinyl ester resins prepared by reaction of acrylic acid with an epichlorohydrin/bisphenol-A epoxy and by reacting methacrylic acid with a novolac epoxy.

The method of this invention has many advantages as compared with conventional methods of making small thin plastic parts, such as skiving, laminating or potting methods. Thus, for example, the method is capable of operation at very high speeds without any significant waste of materials. It eliminates the need to use a mold in making the part and thereby provides significant cost savings. It is capable of providing parts of extreme thinness and complex shape while meeting exacting dimensional tolerances. Since the radiation-curable compositions used in the process are totally convertible to product, the problems associated with the use of hazardous solvents in the manufacture of plastic parts are avoided.

The invention has been described in detail with particular reference to preferred embodiments thereof, but it will be understood that variations and modifications can be effected within the spirit and scope of the invention.

What is claimed is:

1. A method of making plastic parts which is especially adapted to the manufacture of small thin parts of complex shape having precise tolerances, said method comprising the steps of:
   1. advancing a support into a casting zone,
   2. casting onto said support within said casting zone a succession of discrete bodies of a viscous composition which is radiation-curable to a solid plastic without undergoing significant shrinkage, said discrete bodies having a thickness in the range from about 0.5 mils to about 250 mils and a predetermined shape corresponding to the shape of the plastic part which it is desired to form and said viscous composition having a viscosity in the range from about 50 centipoises to about 40,000 centipoises such that said discrete bodies are capable of maintaining the shape in which they are cast while supported only by said support during subsequent travel of said support,
   3. advancing said support bearing said discrete bodies of radiation-curable composition into a curing zone while maintaining said discrete bodies in the shape in which they were cast,
   4. irradiating said discrete bodies of radiation-curable composition within said curing zone to effect curing of said composition and form thereby solid plastic bodies having the desired shape and precise tolerances, and
   5. withdrawing said support bearing said discrete bodies of solid plastic from said curing zone.

2. The method of claim 1 wherein said viscous composition has a viscosity in the range of from about 100 to about 20,000 centipoises and said discrete bodies are cast with a thickness in the range of from about 1 to about 50 mils.

3. The method of claim 1 wherein said viscous composition has a viscosity in the range of from about 200 to about 10,000 centipoises and said discrete bodies are cast with a thickness in the range of from about 2 to about 20 mils.

4. The method of claim 1 wherein said viscous composition comprises an unsaturated polymer and a polymerizable monomer and is cured by irradiation with high energy electrons.

5. The method of claim 1 wherein said viscous composition comprises an unsaturated polymer, a polymerizable monomer, and a photoinitiator and is cured by irradiation with ultraviolet light.

6. The method of claim 1 wherein said viscous composition is thixotropic.

7. The method of claim 1 wherein said viscous composition is cast onto said support by intermittent screen printing.

8. The method of claim 1 wherein said viscous composition is cast onto said support by rotary screen printing.

9. The method of claim 1 wherein said viscous composition is cast onto said support by gravure printing.

10. The method of claim 1 wherein said viscous composition is bonded to said support by said curing.

11. The method of claim 1 wherein said cured bodies are stripped from said support after said curing.

12. The method of claim 1 wherein said support is subjected prior to being advanced into the casting zone to a surface treatment that provides improved bonding of said viscous composition to said support.

13. The method of claim 1 wherein said support is subjected prior to being advanced into the casting zone to a corona discharge treatment to provide improved bonding of said viscous composition to said support.

14. A method of making plastic parts which is especially adapted to the manufacture of small thin parts of complex shape having precise tolerances, said method comprising the steps of:
   1. advancing a polymeric web into a casting zone,
   2. casting onto the surface of said web within said casting zone a succession of discrete bodies of a viscous composition which is radiation-curable to a solid plastic without undergoing significant shrinkage, said discrete bodies having a predetermined shape corresponding to the shape of the plastic part which it is desired to form and a thickness in the range of from about 2 to about 20 mils, and said viscous composition having a viscosity in the range from about 200 to about 10,000 centipoises whereby said discrete bodies maintain the shape in which they are cast while supported only by said web during subsequent travel of said web,
   3. advancing said web bearing said discrete bodies of radiation-curable composition into a curing zone while maintaining said discrete bodies in the shape in which they were cast,
   4. irradiating said discrete bodies of radiation-curable composition within said curing zone to effect curing of said composition and form thereby solid plastic bodies having the desired shape and precise tolerances which are strippable from said web,
   5. withdrawing said web bearing said discrete bodies of solid plastic from said curing zone, and
   6. stripping said discrete bodies of solid plastic from said web to thereby obtain the desired plastic part.

15. A method of making plastic parts which is especially adapted to the manufacture of small thin part of complex shape having precise tolerances, said method comprising the steps of:
   1. advancing a polymeric web into a casting zone,
   2. casting onto the surface of said web within said casting zone a succession of discrete bodies of a viscous composition which is radiation-curable to a solid plastic without undergoing significant shrinkage, said discrete bodies have a predetermined shape corresponding to the shape of the plastic part which it is desired to form and a thickness in the range of from about 2 to about 20 mils, and said viscous composition having a viscosity in the range from about 200 to about 10,000 centipoises whereby said discrete bodies maintain the shape in which they are cast while supported only by said web during subsequent travel of said web,
3. advancing said web bearing said discrete bodies of a radiation-curable composition into a curing zone while maintaining said discrete bodies in the shape in which they were cast,
4. irradiating said discrete bodies of radiation-curable composition within said curing zone to effect curing of said composition and form thereby solid plastic bodies having the desired shape and precise tolerances which are bonded to said web,
5. withdrawing said web bearing said discrete bodies of solid plastic from said curing zone, and
6. cutting said web into portions each of which includes at least one of said discrete bodies of solid plastic to thereby obtain the desired plastic part.

* * * * *